United States Patent [19]

Schaaf et al.

[11] 4,281,791
[45] Aug. 4, 1981

[54] TRACTION AID DEVICE

[76] Inventors: Cecil F. Schaaf; Craig R. Schaaf, both of 3015 Palmer Rd., Standish, Mich. 48658

[21] Appl. No.: 101,729

[22] Filed: Dec. 10, 1979

[51] Int. Cl.³ .............................................. E01B 23/00
[52] U.S. Cl. ....................................... 238/14; 106/13; 206/216; 404/35
[58] Field of Search ........................... 238/14; 152/208; 405/19; 206/216; 222/541; 229/3.5 R, 74; 404/35; 106/13, 36

[56] References Cited

U.S. PATENT DOCUMENTS 2,438,563  3/1948  Kollmeyer .............................. 238/14

FOREIGN PATENT DOCUMENTS 653658  12/1962  Canada ....................................... 238/14
715939  8/1965  Canada ....................................... 238/14

Primary Examiner—John T. Goolkasian
Assistant Examiner—Thomas Bokan
Attorney, Agent, or Firm—Berton S. Sheppard

[57] ABSTRACT

A motor vehicle traction aid device including a plastic bag containing a sand mixture for insertion under a tire on a drive wheel of a motor vehicle for improving traction on ice, snow or the like. The bag is partially filled with the sand material and includes a foam or sponge rubber tab on one side. The bag is inserted between the driving surface and the tire of the motor vehicle such that the tab engages the tire. Rotation of the wheel toward the driving surface causes the tire to engage the tab, drawing the bag and the sand material under the tire in a rolling action, bursting the bag and dispensing the sand beneath the tire.

7 Claims, 3 Drawing Figures

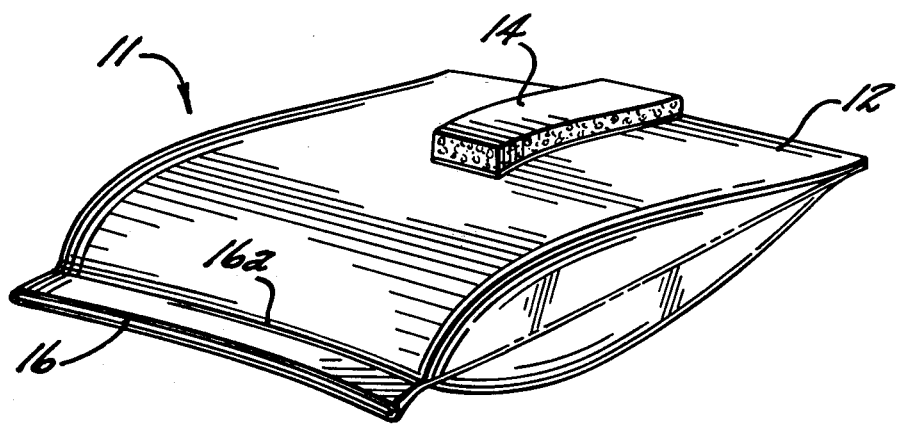
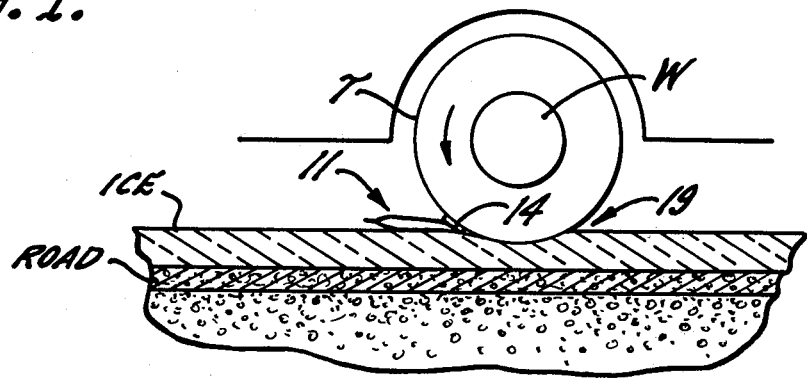
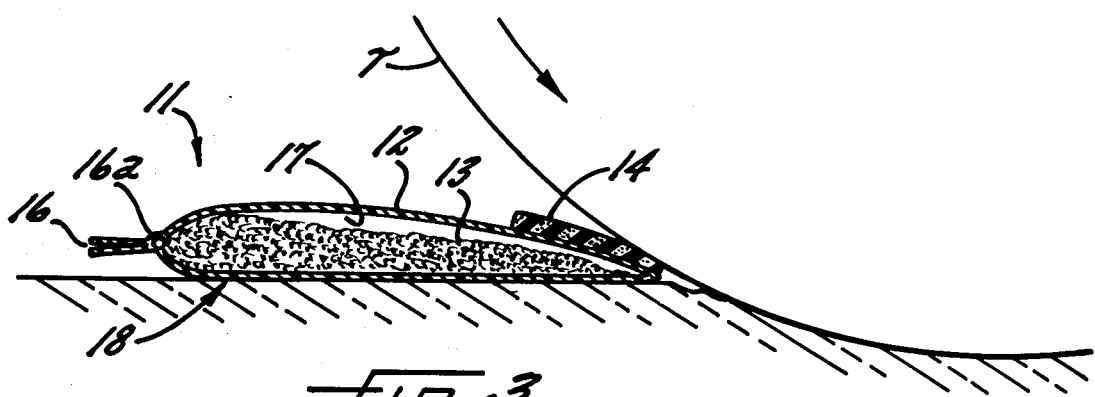

TRACTION AID DEVICE

DESCRIPTION OF THE INVENTION

This invention relates to traction aid devices for motor vehicles and more particularly concerns such devices of a portable, disposable nature wherein a traction-producing material is dispensed beneath the tire on a drive wheel of the motor vehicle.

When a motor vehicle loses traction and becomes stuck on a surface such as ice or firmly packed snow, one or more drive wheels usually remain stationary and, by spinning, heat the ice or snow, settling into self-created indentations or depressions in the ice or snow. Subsequent attempts to move the vehicle meet greater resistance as each of the depressions become deeper and the traction between each tire and the ice or snow, which remains small, is insufficient to lift the vehicle wheels out of the self-created depressions.

Various means have been devised for preventing such situations, such as studded snow tires, now illegal in many areas, cumbersome chains, or ordinary snow tires, which are often ineffective. Once a vehicle is immobilized as described above with one or more wheels settled into the ice or snow, the vehicle must be pushed out of difficulty, which generally requires several people or a tow truck. Alternatively, the ice and/or snow must be shoveled sufficiently to free the vehicle. Such shoveling is difficult since the area which particularly needs to be shoveled is the now-frozen, formerly-melted portion of the snow or ice immediately in front of the tires on the drive wheels of the vehicle.

Another alternative for freeing the vehicle is to attempt to insert a traction-improving material or device beneath the tire of a wheel which is stuck. Throwing sand or salt at the front of the tire fails to dispense the sand or salt beneath the tire so that the needed traction is not obtained. The use of pads or mats is also ineffective since the pad is generally merely pulled under the tire and spun out again, perhaps endangering persons attempting to push the vehicle.

One traction pad device has been made by filling a paper bag with sand, gravel, rock salt or the like and attaching a piece of sandpaper or a serrated sheet of paper or cloth to serve as a tab to one end of the bag. Theoretically, insertion of the tab beneath the tire of a drive wheel which is stuck on snow or ice causes the tab and bag to be drawn beneath the wheel, dispersing the contents of the bag. It has been found that the use of such a device generally will not result in the dispensing of the sand or salt beneath the tire on the drive wheel, but instead the tab will be ripped from the bag and ejected from the other side of the drive wheel. Sometimes the full bag will be drawn up to the point of contact between the drive wheel tire and the ice or snow surface and then burst, spreading the sand or salt on either side of the tire rather than beneath it.

It is consequently an object of the present invention to provide an improved traction aid device for dispensing sand or other abrasive material beneath the tire of a drive wheel of a motor vehicle which is stuck on packed snow or ice or the like.

It is a further object of the present invention to provide such a device which is readily drawn beneath the tire of a drive wheel of a motor vehicle by a rolling action to insure advantageous dispensing of the sand or other abrasive material for improving traction.

Further objects and advantages of the present invention shall be apparent from the following detailed description and upon reference to the drawings, in which:

FIG. 1 is a perspective view of a traction aid device constructed in accordance with the present invention;

FIG. 2 is a side view, partially in section, of the device of FIG. 1 employed with the drive wheel of a motor vehicle; and FIG. 3 is an enlarged view, partially in section, of the traction aid device and wheel of FIG. 2.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

With reference to the figures, a traction aid device 11 includes a thin plastic bag 12 partially filled with a sand mixture 13. A tab 14 of foam rubber or sponge rubber is attached to the top side of the bag 12. The tab 14 is attached near the center of the bag 12 at one end, and an openable "snap-lock" closure or fastener 16a is provided for an opening 16 at the other end of the bag. The opening 16 permits placing the sand mixture in the bag 12.

After the sand mixture 13 is placed in the bag through the opening 16, the "snap-lock" fastener 16a is closed rendering the interior of the bag substantially air tight. The sand mixture 13 does not fill the interior of the bag 12 so that there is an air space 17 remaining inside the bag after the bag is closed. Other means rather than the closure 16a may be used for sealing or closing the opening in the bag 12 after the sand mixture 13 has been inserted, such as heatsealing for example.

It has been found convenient to use an adhesive-backed tab 14 for ease of attachment of the tab to the bag 12, but other fastening means may be employed. The tab material 14, as indicated above, is preferably sponge or foam rubber, but other compressible tab materials may be employed. It is preferred that the material be of a type which has a reasonably large coefficient of friction between itself and a wet tire on a motor vehicle.

The sand mixture 13 in the bag 12 is preferably a mortar-like material: sand with a lime or cement additive. A preferred ratio is about one tablespoon of lime per pound of sand. Alternatively, sand alone, or other coarse granular substance may be used in the bag 12.

In use, the traction aid device 11 is inserted into the wedge-like space between the front of the tire T on a driving wheel W and the ice or other low traction surface. For example, the traction aid device 11 may be employed on an ice surface over a road as shown in FIG. 2. The tire T on the wheel W as shown in FIG. 2 has created and settled into an indentation or depression in the ice from the rotation of the wheel W.

The traction aid device 11 is inserted into the wedge-like opening between the ice and the tire T with the end of the bag 12 adjacent the tab 14 contacting the tire. The tab 14 is on the upper side of the bag 12, and when the bag is advanced into the opening the tab 14 is partially pressed against the tire T. The tire T is then rotated slowly by slowly accelerating the motor vehicle. The rotating tire engages the tab and draws the bag and the sand mixture 13 in the bag under the wheel in a rolling action. The bag, as viewed in FIGS. 2 and 3, rotates about the sand mixture 13 in a clockwise direction as the tab 14 and subsequently the bag 12 are drawn beneath the tire T into the indentation or depression in the ice.

The sand 13 rolls inside the bag 12 as both the bag and the sand are pulled at least partially beneath the tire T, and the bag 12 bursts or comes apart. Typically, for the "snap-lock" 16a configuration illustrated, the bag bursts along the "snap-lock" portion. This bursting or coming apart typically occurs after the closure 16a portion has "rolled" with the bag 12 past its initial contact point with the tire T. Therefore, the bag 12 has rolled to a point where the bottom of the bag, such as at the location 18, is in contact with the tire T when the "snap-lock" portion 16a opens. Therefore, beginning approximately at the location 18 the bag 12 is drawn through the indentation or depression and ejected on the rear side of the tire T as indicated at 19 in FIG. 2. With the above-described "rolling" and bursting action, the sand 13 is dispensed advantageously beneath the tire T providing greatly improved traction for the drive wheel W so that the vehicle may proceed easily on its way. The ejection of the thin flexible plastic bag 12 presents no danger to persons to the rear of the motor vehicle such as would be presented by the ejection of a rigid mat or tab.

It can be seen therefore that a traction aid device has been provided which efficiently dispenses a traction assisting material such as sand beneath a motor vehicle tire which has lost traction on driving surfaces such as snow or ice.

What is claimed is:

1. A traction aid device for improving the traction of a drive wheel of a motor vehicle on a low traction driving surface such as ice comprising: a bag, coarse granular material only partially filling the bag, and a compressible tab attached along one side of the bag whereby, upon the insertion of the bag between the wheel and the driving surface with the tab engaging the wheel, rotation of the wheel toward the driving surface engages the tab and draws the bag and granular material under the wheel in a rolling action, bursting the bag and dispensing the granular material beneath the wheel.

2. The traction aid device of claim 1 in which the bag is constructed of a thin plastic material.

3. The traction aid device of claim 1 in which the granular material comprises lime mixed with sand so as to form a mortar-like substance in the presence of water.

4. The traction aid device of claim 1 in which the tab is constructed of a foam rubber material.

5. The traction aid device of claim 1 in which the tab is constructed of a sponge rubber material.

6. The traction aid device of either of claims 4 or 5 in which the tab includes an adhesive backing for attaching the tab to the bag.

7. The traction aid device of claim 2 in which the tab is along one side of the bag nearest a first end, and in which, on the opposite end of the bag from the first end, the bag includes a closure for an opening through which the granular material has been inserted into the bag.

* * * * *